United States Patent [19]
Friesen

[11] Patent Number: 4,695,244
[45] Date of Patent: Sep. 22, 1987

[54] ROTATIONAL ARM FOR MOLDING MACHINE

[76] Inventor: Peter Friesen, R.R. 1, Box 314, Group 24, Winkler, Manitoba R0G 2X0, Canada

[21] Appl. No.: 816,406

[22] Filed: Jan. 6, 1986

[51] Int. Cl.$^4$ ............................................. B28B 1/20
[52] U.S. Cl. ................................. 425/429; 425/430; 425/434; 425/435
[58] Field of Search ............... 425/425, 429, 430, 435, 425/434; 301/126, 131, 132; 264/310, 311; 308/8.1, 36.7

[56] References Cited

U.S. PATENT DOCUMENTS

| | | | |
|---|---|---|---|
| 2,603,836 | 7/1952 | Rempel | 425/430 |
| 2,624,072 | 1/1953 | Delacoste et al. | 425/430 X |
| 3,012,298 | 12/1961 | Ramsey et al. | 425/429 |
| 3,016,573 | 1/1962 | Blue | 425/430 |
| 3,095,260 | 6/1963 | Ferriot | 425/430 |
| 3,309,439 | 3/1967 | Nonweiler | 425/429 X |
| 3,337,662 | 8/1967 | Spencer | 425/429 X |
| 3,838,964 | 10/1974 | Hake | 425/429 |
| 3,938,928 | 2/1976 | Andrews | 425/430 |
| 4,247,279 | 1/1981 | Masters | 425/429 X |

FOREIGN PATENT DOCUMENTS 767547 9/1967 Canada ............................. 425/425

Primary Examiner—Richard L. Chiesa
Attorney, Agent, or Firm—Stanley G. Ade; Adrian D. Battison

[57] ABSTRACT

The present invention consists of a spindle arm for use in batch-type rotational plastic molding machines. The invention herein includes two cylindrical arms, one end of each arm attached to a gear housing and extending therefrom in a common axis. The gear housing contains gears for providing connection between and transmission of rotation from, a driving shaft, extending from the gear housing, to a driven shaft, extending through the gear housing in an axis perpendicular to the driving shaft. The end of the driving shaft extending from the gear housing is attached to a drive sprocket, the sprocket providing for releasable connection to a drive motor of the molding machine. The driving shaft is contained within one of the cylindrical arms and is rotatably supported therein. The other cylindrical arm is attached, on the end extending from the gear housing, to a second drive sprocket for providing releasable connection to a further drive motor of the molding machine.

12 Claims, 2 Drawing Figures

4,695,244

ROTATIONAL ARM FOR MOLDING MACHINE

BACKGROUND OF THE INVENTION

The present invention relates to machines for the rotational molding of plastics and in particular to spindle arms used therein. Attention is diverted to my copending application, Ser. No. 822,800 filed Jan. 27, 1986 of which this invention forms a part and the disclosure of which is incorporated herein by reference.

Rotational molding machines are particularly well adapted for the manufacture of large parts from vinyl plastisols. The specific materials which work well in conjunction with rotational molding machines include thermoplastic polyethylene powders and in particular low density polyethylene. Other forms of thermoplastic powders which have been commercially used with rotational molding machines include low and high density polyethylene, polyethylene copolymers, cellulose acetate-butyrate, vinyl dry blends, impact styrenes and high-modulate thermoplastics. These materials are introduced into a mold as either a heat convertible liquid or as a powder, wherein the rotational molding process changes the physical form of the material to a continuous solid. This change occurs while the mold is heated and simultaneously rotated about two perpendicular axes within the machine.

A rotational molding machine may be adapted to hold one or a plurality of molds during the rotational molding process, the molds being held within the machine on a framework called a spider. The spider is attached to a spindle arm, which spindle arm imparts the necessary two-axis drive to the spider during the molding process. After the heated rotation the molds are cooled, unloaded from the spider and the finished parts are then removed or "stripped" from the molds. The molds can then be recharged with fresh plastic and loaded onto the spider to repeat the process.

Rotational molding machines are generally classified as batch-type machines or continuous machines. Continuous rotational molding machines typically are semi-automatic or fully automated, having a plurality of driven spindles upon which the spiders are attached with the path of travel of the spiders passing through various processing stations which permit loading, heating, cooling and stripping of the molds so that the machine operates more or less continuously. The batch-type rotational molding machine, to which type of machine the present invention is directed, is generally less expensive than a continuous machine and typically utilizes a rotatable spindle permanently mounted within an oven, wherein the loading, heating, cooling and stripping process steps are performed. With some machines the spiders can be removed from the spindle and moved manually from the oven to a cooling, unloading and stripping station, so that some of these operational process steps may be performed outside of the oven. However, as temperatures of up to 1200° F. can be required during the rotational heating process, considerable time can be required for the spiders to cool sufficiently to permit their detachment from the spindle. This cooling time represents time during which the oven and spindle cannot be used to process other parts and therefore batch-type machines generally have a lower production rate than do continuous machines.

In batch-type rotational molding machines it is desirable to handle and process molds of widely varying dimensional configurations, in order to facilitate the manufacture of plastic parts of different sizes and shapes. In accomplishing this purpose it is frequently desirable to remove the entire rotational arm assembly from the machine and substitute therefore an offset rotational arm, capable of handling different and larger mold configurations. Accordingly, there is a need for a rotational arm and spindle that can be readily removed from a batch-type rotational molding machine so that a different configuration rotational arm and spindle assembly can be quickly installed. It is desirable that this removal operation be performed even while the molds are still attached to the rotational arm assembly so as to reduce equipment downtime between batch manufacturing steps.

SUMMARY OF THE INVENTION

The present invention comprises a rotational arm and spindle for use in rotational molding machines, which provides for quick releasable attachment of the arm and spindle to the molding machine. The invention includes a first cylindrical fixed shaft connected on one end to one side of a gear housing and connected on its other end to a releasable connecting drive means, for connection with a drive motor of the molding machine. The drive motor when so connected can rotate the fixed shaft thereby rotating the gear housing about the axis of the fixed shaft. A hollow cylindrical pinion housing is connected to the other side of the gear housing and is aligned along the same axis as the first fixed shaft. An internal rotatable shaft is contained inside the housing with a releasable connecting drive means attached to its outer end.

The gear housing contains a first gear connected to the internal rotatable shaft and a second gear engageable by the first gear. The second gear is attached to a spindle shaft which projects from the gear housing along an axis orthogonal to the fixed shaft axis. Spiders may be attached to respective ends of the spindle shaft, and simultaneous rotation of the fixed shaft and of the internal rotatable shaft imparts two-axis rotation to the spiders.

The first fixed shaft and the hollow cylindrical spindle housing are of sufficient length to locate a gear housing, hence the spiders, within the confines of the oven portion of a molding machine, and to extend the connecting means ends of the fixed shaft and of the internal rotatable shaft exterior of the oven portion.

The cylindrical nature of the pinion housing and the fixed shaft allows for easy removable rotational mounting of the spiders in the molding machine through the use of a variety of conventional mounting means such as supporting casters or bearings, and by disconnection of the releasable connecting means the assembly can be lifted from the molding machine. Therefore, after abatch processing and manufacturing operation has been completed, the spindle arm, using a variety of lifting means such as a forklift, or a winch and cable, can be immediately removed from the oven without requiring a cooling period. Thus, another batch of molds can then be processed by placing an alternate assembly into the machine.

The spindle arm of the present invention also includes a thrust plate which prevents longitudinal movement of the spindle arm during rotation of the spiders.

It is therefore an object of the present invention to provide for a spindle and rotational arm assembly for use in batch-type rotational plastic molding machines that is easily removable from the machine.

It is also an object of the present invention to provide a spindle arm that prevents longitudinal movement thereof during rotation.

It is a further object of the present invention to make a spindle arm that is easy and inexpensive to manufacture and use.

BRIEF DESCRIPTION OF THE DRAWINGS

The foregoing and other objects and advantages of the present invention will become apparent from the following specification and claims and with reference to the appended drawings in which:

DESCRIPTION OF THE PREFERRED EMBODIMENT

Figure 1:
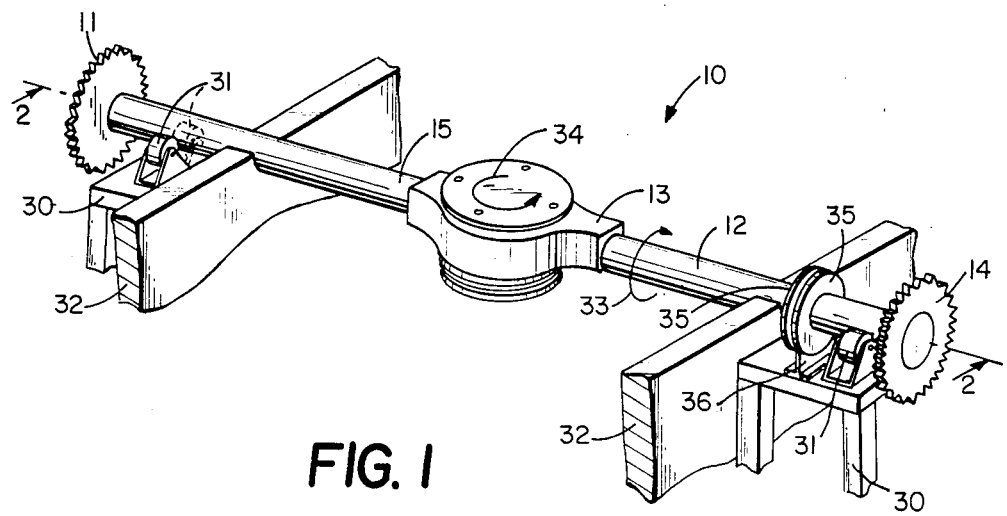
FIG. 1 shows an isometric view of the invention.
Figure 2:
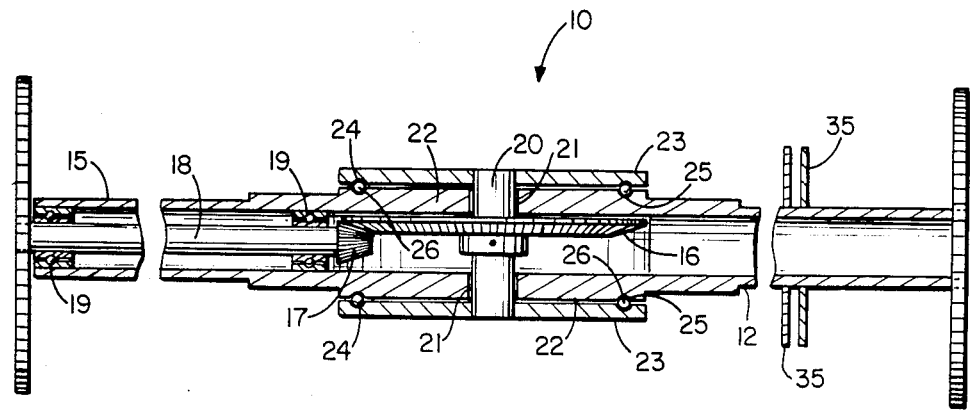
FIG. 2 shows a longitudinal cross sectional view of the present invention.

Referring to FIGS. 1 and 2 the spindle arm of the present invention is generally designated 10. Spindle arm 10 consists of cylindrical fixed shaft 12 which may be solid or tubular, attached to gear housing 13 and having sprocket 14 attached to its opposite end. Spindle arm 10 also includes cylindrical and tubular pinion housing 15 attached on one end to gear housing 13 opposite the point of attachment of fixed shaft 12, and housing 15 is preferably of the same outside diameter as fixed shaft 12. Gear housing 13 encloses bevel gear 16 and pinion gear 17. Pinion shaft 18 is located within pinion housing 15. Pinion shaft 18 is rotatably mounted within housing 15 on bearings 19, and is connected on one end to pinion gear 17 and on its opposite end to pinion drive sprocket 11. Bevel gear 16 is attached to spindle axle 20. Axle 20 passes through the center of bevel gear 16 and through holes 21 located in gear housing 13. The exterior surface of gear housing 13 includes two opposite facing flat bearing surfaces 22. Bearing plates 23 are attached to opposite ends of axle 20, each in close proximity to a bearing surface 22. Each bearing plate 23 has a circular bearing plate groove 24 around its perimeter which groove 24 cooperates with a similar bearing surface groove 25 in each bearing surface 22, thereby forming a bearing track for location therein of ball bearings 26. Bearings 26 provide for essentially frictionless load bearing support of plates 23. The spider framework containing the plastic molds may be respectively attached to bearing plates 23.

Spindle arm 10 includes thrust plates 35, preferably attached to fixed shaft 12. An intermediate flange 36 may be located on support 30 to fit between thrust plates 35 when spindle arm 10 is in position on the molding machine. Intermediate plate 36 thereby prevents movement of spindle arm 10 in the longitudinal direction of fixed shaft 12 when spindle arm 10 is actuated.

The basic operation of the present invention can now be appreciated by reference to FIG. 1 wherein spindle arm 10 is located on supports 30. Supports 30 include casters 31 for releaseable rotational support of spindle arm 10, wherein the opposing cylindrical surfaces of fixed shaft 12 and housing 15 provide for smooth rotational cooperation with casters 31. Sides 32 are a diagrammatic representation of a portion of the oven sides of a rotational molding machine wherein gear housing 10 is located within the oven. Rotation of fixed shaft sprocket 14 will rotate gear housing 13 about the axis of shaft 12, which axis is perpendicular to axle 20. Rotation of pinion drive sprocket 11 will rotate axle 20, and hence bearing plates 23, to which bearing plates are attached the spider frameworks containing the plastic molds about an axis of rotation is perpendicular to shaft 12. The combination of each axis of rotation thereby provides the two orthogonal axes of rotation needed in a rotational molding process.

The drive means of the molding machine for rotating sprockets 11 and 14 is not shown but typically consists of electric motors for driving each sprocket wherein each motor has a shaft and a sprocket attached thereto and a chain for engagement of the motor shaft sprockets with sprockets 14 and 11. It is necessary that the drive motors be movable relative to spindle arm 10 so that each chain engaging each sprocket 11 and 14 can be loosened and thereby removed from sprockets 11 and 14 so that spindle arm 10 can be easily removed from the molding machine. Various means can be used to connect the motors with fixed shaft 12 and pinion shaft 18, such as a pulley and belt assembly or a gear assembly. The particular connecting means not being important to the present invention, rather the quick disengagement of the drive means being the critical factor. A sprocket and chain assembly is preferably selected as such assembly provides for quick disengagement and is also easy and inexpensive to manufacture.

The present invention may be embodied in other specific forms without departing from the spirit or scope of the essential attributes thereof, and it is therefore desired that the present embodiment be considered in all respects as illustrative and not restrictive, reference being made to the appended claims rather than to the foregoing description to indicate the scope of the invention.

What is claimed is:

1. A rotational molding machine comprising two spaced outside walls each defining an upper surface, a first and a second support, each provided exteriorly of a respective one of the outside walls adjacent said upper surface thereof, a spindle arm for detachable use and supportable mounting between said outside walls, comprising a gear housing having an input drive gear means and an output drive gear means, for orthogonally translating rotational motion of said input drive gear means to said output drive gear means; a cylindrical shaft lying along an axis and having a first end attached to said gear housing and a length greater than approximately one-half the distance between said walls, and having a second end with a rotational drive means attached thereto, for receiving a rotational drive coupling from a driving source mounted on said first support; a hollow cylindrical housing lying along said axis and having a first end attached to said gear housing and a length greater than approximately one-half the distance between said walls, said cylindrical housing being oppositely positioned from said cylindrical shaft relative to said gear housing; a driving shaft in said hollow cylindrical housing and having a first end connected to said input drive gear means and a second end projecting from said cylindrical housing and having a rotational drive means attached thereto for receiving rotational drive coupling from a driving source mounted on said second support; a driven shaft connected to said output drive gear means and projecting externally of said gear housing; first and second bearing means each mounted on a respective one of said supports for receiving and supporting respectivley said cylindrical shaft and said cylindrical housing for rotation about said axis and arranged at a height such that said cylindrical shaft and cylindrical housing extend across said upper surfaces, each of said bearing means being arranged for readily releasing said cylindrical shaft and cylindrical housing for upward movement from said supports and means mounted on one of said supports separate from said bearing means for limiting axial movement of said cylindrical shaft, said hollow cylindrical housing and said gear housing.

2. The apparatus of claim 1, wherein each of said bearing means comprises a pair of roller members each mounted on a respective one of said first and second supports and arranged to support one of said cylindrical shaft and said cylindrical housing only from below so that the cylindrical shaft and cylindrical housing can be lifted therefrom.

3. The apparatus of claim 2 wherein said rotational drive means of said cylindrical shaft and said rotational drive means of said driving shaft each include a sprocket member and a flexible continuous drive member wrapped therearound so as to extend therefrom downwardly to apply a downwardly force to said cylindrical shaft and said cylindrical housing.

4. The apparatus of claim 1, wherein said driven shaft has a first end projecting externally of said gear housing and a second end oppositely projecting externally of said gear housing.

5. The apparatus of claim 4, further comprising a bearing plate respectively affixed to each of said first end and said second end of said driven shaft in close proximity to said gear housing.

6. The apparatus of claim 5, further comprising bearing members between said respective bearing plates and said gear housing.

7. The apparatus of claim 1, further comprising a bearing plate affixed to said driven shaft in close proximity to said gear housing.

8. The apparatus of claim 7, further comprising bearing members between said bearing plate and said gear housing.

9. The apparatus of claim 1, wherein said means for limiting axial movement further comprises a thrust plate affixed to either of said cylindrical shaft or said hollow cylindrical housing.

10. The apparatus of claim 1, wherein said means for limiting axial movement further comprises a pair of spaced apart plates and an intermediate plate, engageable between said spindle arm and said rotational molding machine.

11. The apparatus of claim 1, wherein said input drive gear means further comprises a pinion gear and said output drive gear means further comprises a bevel gear.

12. The apparatus of claim 11, further comprising a bearing in said hollow cylindrical housing supporting said driving shaft.

* * * * *